(12) United States Patent
Tan et al.

(10) Patent No.: US 8,195,250 B2
(45) Date of Patent: Jun. 5, 2012

(54) METHOD AND APPARATUS FOR CONTROLLING POWER AMONG MODEMS IN A MULTI-MODE MOBILE COMMUNICATION DEVICE

(75) Inventors: Geroncio O. Tan, Sunrise, FL (US); Anuj Atri, Kardinya (AU); Mauricio J. Flores, Boca Raton, FL (US); Basavanna Vamadevappa Gowda, Gwellup (AU); David R. Heeschen, Coral Springs, FL (US); Gustavo D. Leizerovich, Aventura, FL (US); Prabhu V. Patil, Coral Springs, FL (US)

(73) Assignee: Motorola Mobility, Inc., Libertyville, IL (US)

( * ) Notice: Subject to any disclaimer, the term of this patent is extended or adjusted under 35 U.S.C. 154(b) by 637 days.

(21) Appl. No.: 12/112,031

(22) Filed: Apr. 30, 2008

(65) Prior Publication Data
US 2009/0275355 A1    Nov. 5, 2009

(51) Int. Cl.
  *H04B 1/38* (2006.01)
  *H04B 1/16* (2006.01)
  *H04M 1/00* (2006.01)
(52) U.S. Cl. ............... 455/574; 455/343.2; 455/571; 455/553.1
(58) Field of Classification Search ............. 455/522, 455/69, 67.11, 63.1, 524, 571, 574, 343.1, 455/343.2, 553.1
See application file for complete search history.

(56) References Cited

U.S. PATENT DOCUMENTS

| | | | |
|---|---|---|---|
| 3,590,323 A | 6/1971 | Mapham et al. | |
| 3,846,694 A | 11/1974 | Archer | |
| 3,852,669 A | 12/1974 | Bowman et al. | |
| 4,209,826 A | 6/1980 | Priegnitz | |
| 4,353,037 A | 10/1982 | Miller | |
| 4,524,412 A | 6/1985 | Eng | |
| 5,043,672 A | 8/1991 | Youn | |
| 5,204,643 A | 4/1993 | Verronen | |
| 5,235,188 A | 8/1993 | Mul | |
| 5,468,684 A | 11/1995 | Yoshimori et al. | |
| 5,524,275 A | 6/1996 | Lindell | |
| 5,682,404 A | 10/1997 | Miller | |
| 5,862,475 A * | 1/1999 | Zicker et al. | 455/419 |
| 5,884,149 A | 3/1999 | Jaakola | |
| 5,940,756 A * | 8/1999 | Sibecas et al. | 455/426.1 |
| 5,946,619 A | 8/1999 | Kolev | |

(Continued)

FOREIGN PATENT DOCUMENTS
WO    0180445 A2    10/2001
(Continued)

OTHER PUBLICATIONS

Young, Declaration of Prior Art Reference, Feb. 2, 2007, 2 pages.
(Continued)

*Primary Examiner* — Tilahun B Gesesse
(74) *Attorney, Agent, or Firm* — Patents on Demand

(57) ABSTRACT

A multi-mode communication device (100) uses a first wireless modem (118) and a second wireless modem (120) which operates independently to facilitate communication over different air interfaces. Both modems are powered by a common battery (105). When the first wireless modem engages in a communication activity, the second wireless modem's maximum operating power level is reduced. When the first wireless modem ceases communication activity, the second wireless modems full operating power range is restored.

17 Claims, 8 Drawing Sheets

U.S. PATENT DOCUMENTS

| | | | |
|---|---|---|---|
| 6,064,857 A | 5/2000 | Wiedeman et al. |
| 6,067,449 A | 5/2000 | Jager |
| 6,141,706 A | 10/2000 | Thornton et al. |
| 6,151,509 A | 11/2000 | Chorey |
| 6,192,230 B1 | 2/2001 | van Bokhorst et al. |
| 6,304,748 B1 | 10/2001 | Li et al. |
| 6,549,625 B1 | 4/2003 | Rautila et al. |
| 6,668,175 B1 | 12/2003 | Almgren et al. |
| 6,697,953 B1 | 2/2004 | Collins |
| 6,710,578 B1 | 3/2004 | Sklovsky |
| 6,710,651 B2 | 3/2004 | Forrester |
| 6,744,743 B2 | 6/2004 | Walton et al. |
| 6,744,813 B1 | 6/2004 | Ko et al. |
| 6,845,246 B1 | 1/2005 | Steer |
| 6,879,133 B1 | 4/2005 | Geren |
| 6,903,533 B1 | 6/2005 | Geren et al. |
| 6,909,708 B1 | 6/2005 | Krishnaswamy et al. |
| 6,960,956 B2 | 11/2005 | Pehlke et al. |
| 6,985,113 B2 | 1/2006 | Nishimura et al. |
| 6,987,986 B2 | 1/2006 | Boesen |
| 7,016,697 B2 * | 3/2006 | Ngai et al. | 455/522 |
| 7,069,043 B2 | 6/2006 | Sawamura et al. |
| 7,076,234 B2 | 7/2006 | Grivas et al. |
| 7,133,419 B1 | 11/2006 | Hendrichs et al. |
| 7,134,029 B2 | 11/2006 | Hepner et al. |
| 7,148,748 B2 | 12/2006 | Apel |
| 7,187,663 B2 | 3/2007 | Schmidt |
| 7,221,955 B2 | 5/2007 | Chen et al. |
| 7,280,505 B2 | 10/2007 | Chaskar et al. |
| 7,366,142 B2 * | 4/2008 | Ngai et al. | 370/335 |
| 7,415,246 B2 * | 8/2008 | Kim et al. | 455/67.11 |
| 7,486,975 B2 | 2/2009 | Mori |
| 7,525,261 B2 | 4/2009 | Van Zundert et al. |
| 7,633,898 B2 | 12/2009 | Jain et al. |
| 8,054,826 B2 | 11/2011 | Cheng et al. |
| 8,059,702 B2 | 11/2011 | Young et al. |
| 2002/0101907 A1 | 8/2002 | Dent et al. |
| 2002/0142791 A1 | 10/2002 | Chen et al. |
| 2003/0078037 A1 | 4/2003 | Auckland et al. |
| 2003/0123425 A1 | 7/2003 | Walton et al. |
| 2003/0149904 A1 | 8/2003 | Kim |
| 2003/0157954 A1 | 8/2003 | Medvedev et al. |
| 2003/0208601 A1 | 11/2003 | Campbell et al. |
| 2003/0228875 A1 | 12/2003 | Alapuranen |
| 2004/0108895 A1 | 6/2004 | Wu et al. |
| 2004/0121799 A1 | 6/2004 | Chiou |
| 2004/0142715 A1 | 7/2004 | Oses |
| 2004/0176125 A1 | 9/2004 | Lee |
| 2004/0204181 A1 | 10/2004 | Cromer et al. |
| 2004/0266470 A1 | 12/2004 | Di Camillo et al. |
| 2005/0075123 A1 | 4/2005 | Jin et al. |
| 2005/0195787 A1 | 9/2005 | Madour et al. |
| 2005/0201321 A1 | 9/2005 | Sinnarajah et al. |
| 2005/0215206 A1 | 9/2005 | Granstrom et al. |
| 2005/0240786 A1 | 10/2005 | Ranganathan |
| 2005/0242879 A1 | 11/2005 | Muller |
| 2005/0272382 A1 | 12/2005 | Amano |
| 2005/0282579 A1 * | 12/2005 | Kim | 455/552.1 |
| 2006/0003793 A1 | 1/2006 | Ngai et al. |
| 2006/0067245 A1 | 3/2006 | Pearl |
| 2006/0084395 A1 | 4/2006 | Kezys et al. |
| 2006/0148430 A1 | 7/2006 | Leizerovich et al. |
| 2006/0194540 A1 | 8/2006 | Hunzinger et al. |
| 2006/0223577 A1 | 10/2006 | Ouzillou |
| 2006/0229029 A1 | 10/2006 | Waltho et al. |
| 2007/0014260 A1 | 1/2007 | Seo |
| 2007/0030063 A1 | 2/2007 | Izumi et al. |
| 2007/0042775 A1 | 2/2007 | Umatt et al. |
| 2007/0049239 A1 | 3/2007 | Joung et al. |
| 2007/0111681 A1 | 5/2007 | Alberth, Jr. et al. |
| 2007/0135154 A1 | 6/2007 | Gautier et al. |
| 2007/0285247 A1 | 12/2007 | Forster |
| 2007/0298835 A1 | 12/2007 | Uehara et al. |
| 2008/0053207 A1 | 3/2008 | Burgan et al. |
| 2008/0062912 A1 | 3/2008 | Tiedemann et al. |
| 2008/0102874 A1 | 5/2008 | Gautier et al. |
| 2008/0118014 A1 | 5/2008 | Reunamaki et al. |
| 2008/0130727 A1 | 6/2008 | Young et al. |
| 2008/0130728 A1 * | 6/2008 | Burgan et al. | 375/222 |
| 2008/0146268 A1 | 6/2008 | Gandhi et al. |
| 2009/0296794 A1 | 12/2009 | Min et al. |

FOREIGN PATENT DOCUMENTS

| | | |
|---|---|---|
| WO | 2005084057 A1 | 9/2005 |

OTHER PUBLICATIONS

United States Patent & Trademark Office, "Non-Final Rejection" for U.S. Appl. No. 11/610,592, Feb. 24, 2010, 12 pages.
United States Patent & Trademark Office, "Non-Final Rejection" for U.S. Appl. No. 11/467,949, Sep. 3, 2009, 15 pages.
United States Patent & Trademark Office, "Non-Final Rejection" for U.S. Appl. No. 11/553,999, Jul. 9, 2009, 16 pages.
Hartman, "Declaration of Prior Art Reference," for U.S. Appl. No. 11/686,351, Feb. 6, 2007, 2 pages.
United States Patent & Trademark Office, "Notice of Allowance" for U.S. Appl. No. 11/686,351, May 31, 2010, 9 pages.
Korean Intellectual Property Office (KIPO), "Notice of Preliminary Rejection" for Korean Appln. No. 10-2009-7013580 Feb. 28, 2011, pp. 1-5.
Patent Cooperation Treaty, PCT Search Report and Written Opinion of the International Searching Authority for International Application No. PCT/US2007/084906, Jul. 16, 2008, pp. 1-11.
United State Patent and Trademark Office, "Non-Final Office Action Summary", Oct. 2, 2008, pp. 1-22, U.S. Appl. No. 11/273,231.
United State Patent and Trademark Office. "Non-Final Office Action Summary", Aug, 19, 2010, pp. 1-19, U.S. Appl. No. 11/273,231.
United State Patent and Trademark Office. "Non-Final Office Action Summary", Jul. 11, 2011, pp. 1-29, U.S. Appl. No. 11/273,231.
United State Patent and Trademark Office. "Non-Final Office Action Summary", Mar. 3, 2009, pp. 1-15, U.S. Appl. No. 11/426,710.
United State Patent and Trademark Office,"Non-Final Office Action Summary", Dec. 27, 2010, pp. 1-16, U.S. Appl. No. 11/426,710.
United States Patent & Trademark Office, "Final Rejection" for U.S. Appl. No. 11/533,999, Mar. 29, 2010, 18 pages.
United States Patent & Trademark Office, "Non-Final Rejection" for U.S. Appl. No. 11/686,351, Jul. 28, 2010. 15 pages.
United States Patent & Trademark Office, "Non-Final Rejection" for U.S. Appl. No. 11/886,351, Jan. 14, 2011, 17 pages.
United States Patent & Trademark Office, "Non-Final Rejection" for U.S. Appl. No. 11/686,351, Feb. 26, 2010, 15 pages.
United States Patent & Trademark Office, "Notice of Allowance" for U.S. Appl. No. 11/886,351, May 31, 2010, 9 pages.
United States Patent & Trademark Office, "Non-Final Rejection" for U.S. Appl. No. 11/426,710, Jun. 10, 2011, 51 pages.
United States Patent and Trademark Office, "Non-Final Rejection", for U.S. Appl. No. 11/273,231, Feb. 16, 2011, pp. 1-27.
Korean Intellectual Property Office (KIPO), "Notice of Preliminaty Rejection" for Korean Appln. No. 10-2009-7013580 Feb. 28, 2011, pp. 1-5.
Patent Cooperation Treaty, PCT Search Report and Written Opinion of the International Searching Authority for Internationai Application No. PCT/US2007/084906, Jul. 16, 2008, pp. 1-11.
United States Patent and Trademark Office, "Non-Final Rejection" for U.S. Appl. No. 11/686,426, Jan. 25, 2010, pp. 1-19.
United State Patent and Trademark Office, "Non-Final Office Action Summary ", Oct. 2, 2008, pp. 1-22, U.S. Appl. No. 11/273,231.
United State Patent and Trademark Office, "Non-Final Office Action Summary", Apr. 1, 2009, pp. 1-22, U.S. Appl. No. 11/273,231.
United State Patent and Trademark Office, "Final Office Action Summary", Nov. 2, 2009, pp. 1-27, U.S. Appl. No. 11/273,231.
United State Patent and Trademark Office. "Non-Final Office Action Summary", Aug. 19, 2010, pp. 1-19, U.S. Appl. No. 11/273,231.
United State Patent and Trademark Office. "Non-Final Office Action Summary", Jul. 11, 2011, pp. 1-29, U.S. Appl. No. 11/273,231.
United State Patent and Trademark Office, "Non-Final Office Action Summary", Mar. 3, 2009, pp. 1-15, U.S. Appl. No. 11/476,710.
United State Patent and Trademark Office, "Non-Final Office Action Summary", Sep. 3, 2009, pp. 1-15, U.S. Appl. No. 11/426,710.

United State Patent and Trademark Office, "Non-Final Office Action Summary", Jul. 20, 2010, pp. 1-9, U.S. Appl. No. 11/426,710.
United State Patent and Trademark Office, "Non-Final Office Action Summary", Dec. 27, 2010, pp. 1-16, U.S. Appl. No. 11/426,710.
United States Patent and Trademark Office, "Non-Final Rejection" for U.S. Appl. No. 11/610,592 dated Oct. 14, 2011, 22 pages.

United States Patent and Trademark Office, "Final Rejection" for U.S. Appl. No. 11/273,231 dated Dec. 19, 2011, 26 pages.
United States Patent and Trademark Office, "Non-Final Rejection" for U.S. Appl. No. 11/686,426 dated Jan. 6, 2012, 46 pages.

* cited by examiner

METHOD AND APPARATUS FOR CONTROLLING POWER AMONG MODEMS IN A MULTI-MODE MOBILE COMMUNICATION DEVICE

FIELD OF THE INVENTION

The invention relates generally to multi-mode mobile communication devices, and more particularly to means of reducing the peak current drawn from a battery source when multiple modems of the device are simultaneously engaged in communication activity.

BACKGROUND OF THE INVENTION

Multi-mode mobile communication devices are popular in certain regions of the world for a variety of reasons. For example, since new communication systems are initially deployed in limited areas, it may be desirable for a mobile communication device to be able to communicate using a mature, widely-deployed system in addition to a newer system. One example of a next generation communication system is that specified by the Institute of Electrical and Electronic Engineers (IEEE) specification 802.16, known by the trade name WiMAX. A more conventional system would be, for example, that specified by the Global Specification for Mobile communication (GSM) specification. WiMAX provides greater data throughput compared to GSM and its associated data air interface, but is still in the development stage. WiMAX systems will be deployed in areas also served by GSM systems. However, as WiMAX service will not initially be as widely available is GSM service, some subscribers may wish to have access to both systems without having to carry separate mobile communication devices for each system. A multi-mode communication device can be designed with a single modem, and switch from one air interface to another, but it may be more preferable to have dedicated modems in the multi-mode communication device, each for a different air interface, and each being allowed to operate simultaneously. However, having multiple modems in a multi-mode communication device requires more volume, and it draws more power.

Market pressures have compelled manufacturers to constantly reduce the volume of mobile communication devices, or at least reduce the volume of components so that additional sub-systems can be included. A significant volume of a mobile communication device is taken up by the battery. As a result, battery size has been reduced over generations of mobile communication devices. While the electrical efficiently of mobile communication devices has increased substantially, a factor which has facilitated the use of smaller batteries, battery technology has not kept pace. As a consequence, operating multiple modems in a multi-mode mobile communication device using a present conventional-sized battery can result in peak current being drawn from the battery which results in significant battery voltage droop due to the internal resistance of the battery.

High current conditions exist when, for example, both modems are active and transmitting, such as during the handover process when handing a call over from one modem to another modem in the communication device. This is due to both modems having to transmit on their respective air interfaces at overlapping time periods—one modem continues with the call as well as signaling to the respective communication system to commence with the handover while the other modem must likewise signal to its corresponding communication system to receive the call from the first communication system. Without any control, peak current while both modems are transmitting can cause voltage drop out or droop to a level below a minimum operating voltage, possibly resulting in the communication device resetting.

Accordingly, there is a need to control the power consumption of a multi-mode mobile communication device.

SUMMARY OF THE INVENTION

The present invention discloses in one embodiment a method for controlling power among first and second wireless modems in a multi-mode mobile communication device which are commonly powered by a battery of the multi-mode communication device. The method includes commencing a communication activity at the first wireless modem, and asserting a power control indicator while the communication activity occurs at the first wireless modem. The second wireless modem may or may not be engaged in a communication activity when the first wireless modem commences communication activity. While the power control indicator is asserted, the transmit power level of the second wireless modem is restricted to a reduced transmit power level. The reduced transmit power level is lower than a maximum transmit power level, but will allow the second wireless modem to perform communication activity, including allow a previously commenced communication activity to continue at the reduced transmit power level at the second wireless modem. The second wireless modem continues operating at the reduced transmit power level until the communication activity at the first wireless modem is ceased. When the communication activity at the first wireless modem ceases, the invention de-asserts the power control indicator, at which time a communication activity at the second wireless modem may be commenced at a transmit power level exceeding the reduced transmit power level, but is still bounded by a maximum allowable power level for the given class of operation.

Another embodiment of the invention includes a multi-mode mobile communication device having a battery source, and an application processor. Furthermore the multi-mode communication device includes first and second wireless modems coupled to the application processor which are commonly powered by the battery source. The second wireless modem is operated at a reduced transmit power level when the first wireless modem is engaged in a communication activity. The reduced transmit power level is lower than a maximum transmit power level of the second wireless modem and allows the second wireless modem to perform communication activity.

Another embodiment of the invention includes a transmit power control circuit arrangement in a multi-mode mobile communication device which has a first and a second wireless modem. The power control circuit arrangement includes a first baseband processor in the first wireless modem which has a transmit enable output. A second baseband processor in the second wireless modem similarly has a transmit start output and a power control input. A logic function is provided which has a first input coupled to the transmit enable output of the first baseband processor, a second input coupled to the transmit start output of the second baseband processor, and an output coupled to the power control input of the second baseband processor. The logic function provides a power control indicator to the second wireless modem when the first and second wireless modems are simultaneously engaging in communication activity. As a result, the second baseband processor operates a reduced transmit power level while the logic function provides the power control indicator. The reduced power level is lower than a maximum transmit power level of the second wireless modem and allows the second wireless modem to perform communication activity.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

While the specification concludes with claims defining features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

Figure 1:
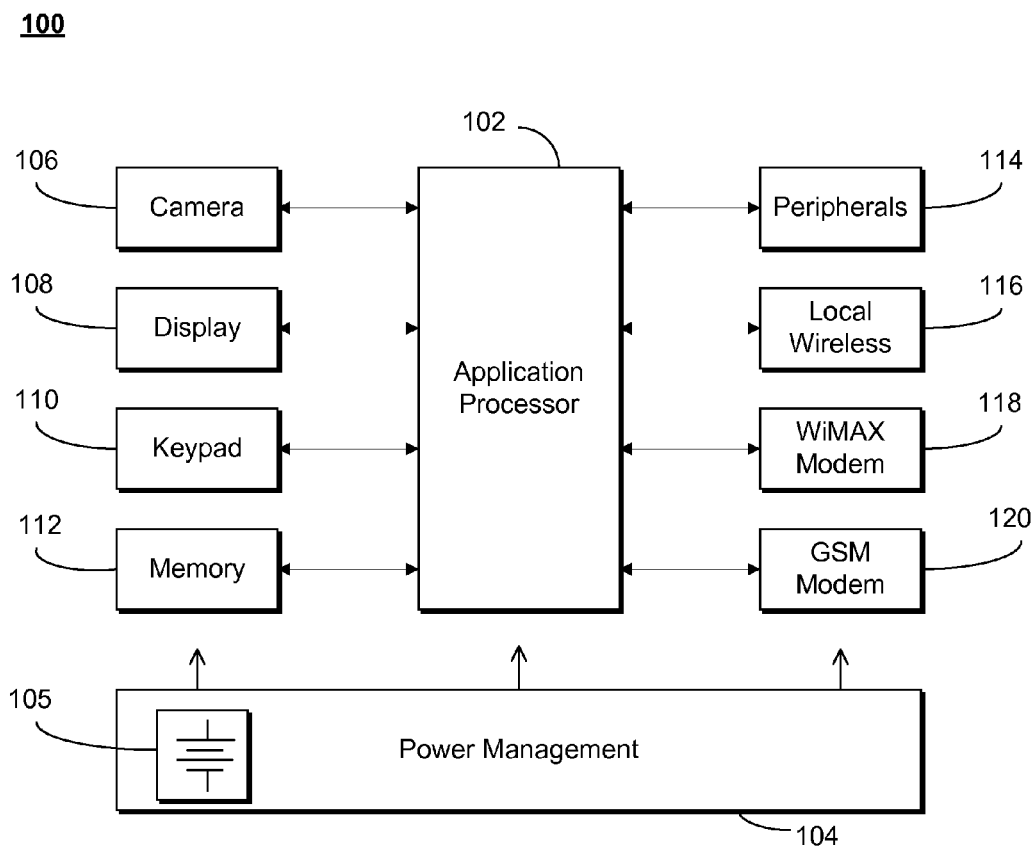
FIG. 1 shows a block schematic diagram of a multi-mode communication device, in accordance with an embodiment of the invention.

Referring to FIG. 1, there is shown a block schematic diagram of a multi-mode communication device 100, in accordance with an embodiment of the invention. Central to the multi-mode communication device are an application processor 102 and a power management system 104. Power is provided to the various components, circuits, and sub-systems of the multi-mode communication device by the power management system, as provided by a battery or battery source 105. The application processor is responsible for the higher functions of the multi-mode communication device, and may delegate lower level processing to peripheral components and sub-systems. For example, the multi-mode communication device may comprise sub-systems such as a camera 106, graphical display 108, keypad and other buttons 110. The multi-mode communication device will typically include a memory element 112 for storing machine readable instruction code and data, and for conducting data processing. The memory may include a variety of memory elements including read only memory, random access memory, and may include reprogrammable memory elements such as flash memory. Furthermore the memory may include permanent or semi-permanent, or both types of memory, as is well known. The multi-mode communication device may comprise additional peripheral components 114 such as ports, or it may support connected peripheral devices through ports or connectors. Additionally, the multi-mode communication device may include a local or personal wireless network interface, such as, for example, a "WiFi" network interface operated in accordance with IEEE specification 802.11. The multi-mode communication device also comprises at least a first wireless modem 118 and a second wireless modem 120. The first and second wireless modems are commonly powered by the battery source and operate using different air interface protocols. For example, the first wireless modem may be operated according to the aforementioned WiMAX specification, while the second wireless modem may be operated according to the GSM specification. Each wireless modem is capable of radio communication with corresponding communication infrastructure equipment, and may carry both packet and circuit data. An example of packet data would be browsable content on the Internet, while an example of circuit data would be live voice data.

Since both wireless modems are capable of independent and simultaneous operation, and they are both commonly powered by the battery source 105, the invention restricts the operating power level of the second wireless modem when the first wireless modem is engaged in a communication activity. When the first wireless modem commences communication activity, a power control indicator is asserted which causes the second wireless modem to operate at a reduced maximum power level to reduce the load on the battery, and still allow the second wireless modem to operate.

Figure 2:
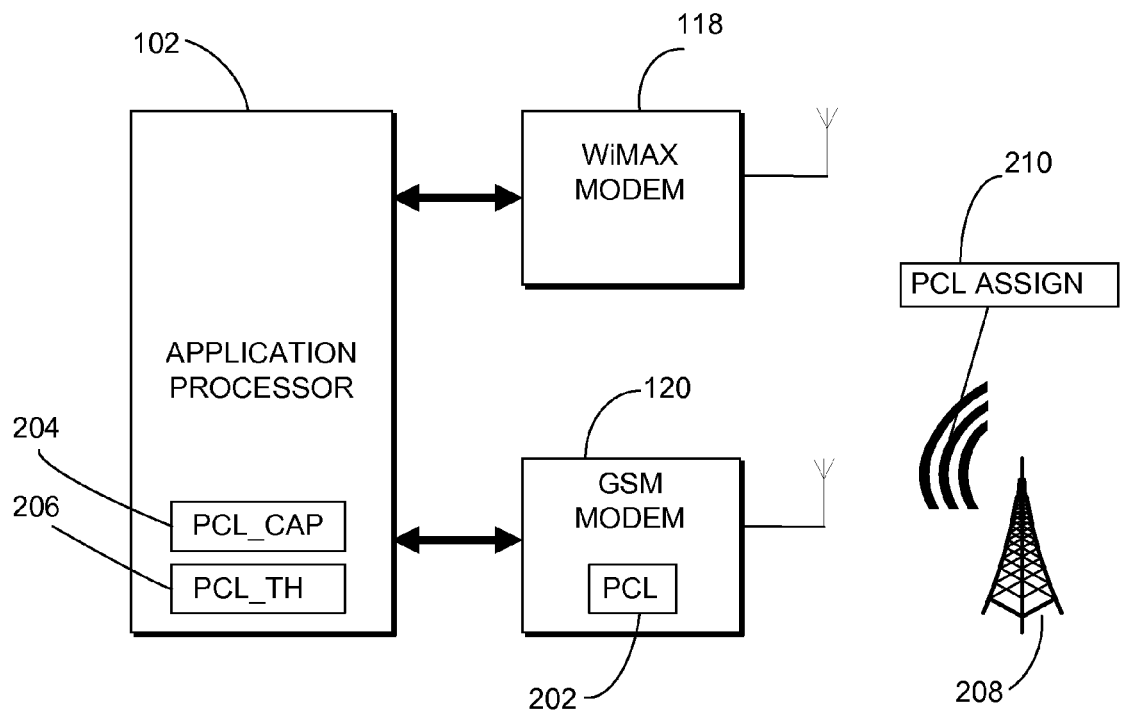
FIG. 2 shows a block schematic diagram of a multi-mode communication device operating in a system environment, in accordance with an embodiment of the invention.

Referring now to FIG. 2, there is shown a block schematic diagram of a multi-mode communication device operating in a system environment 200, in accordance with an embodiment of the invention. Some air interface protocols, including that of the GSM specification, use a power control scheme where the wireless modem maintains a power control level (PCL) 202. The PCL of the present example may be a number corresponding to one of several predefined power levels. Typically the PCL is assigned by a base station 208 or other similar fixed equipment which facilitates mobile communication. For example, the base station 208 may, upon receiving a signal from the GSM modem 120, transmit a PCL control message 210 to the GSM modem. Conventionally, the GSM modem would then set the power output of its transmitter to the corresponding level and commence communication activity. However, according to the present embodiment of the invention, the application processor 102 maintains a power control indicator in the form of a power cap flag, PCL_CAP 204. According to the present embodiment, when the first wireless modem 118 is engaged in a communication activity, the application processor sets or asserts the PCL_CAP flag. Whenever the second wireless modem 120 then commences communication activity, it checks the status of the PCL_CAP flag. If the PCL_CAP flag is set, then the second wireless modem 120 may have to restrict its power output, despite instruction from base station. For example, the application processor may further indicate a power level setting or threshold PCL_TH 206 which will act as a maximum allowed power setting. If PCL_TH 206 is lower, in terms of corresponding transmit power level, than the PCL assigned 210 to the second wireless modem, then the second wireless modem is restricted to PCL_TH and will not transmit at the greater power level indicated in the PCL assigned by the base station. However, if the assigned PCL is lower than PCL_TH, then the second wireless modem will use the setting assigned by the base station. It is contemplated that the PCL_TH may be a static value, or it may be selected dynamically, based on, for example, the state of charge of the battery or the battery voltage, or the number of multi-media devices (e.g., camera, audio amplifier, . . . etc) that are turned on at the time.

Figure 3:
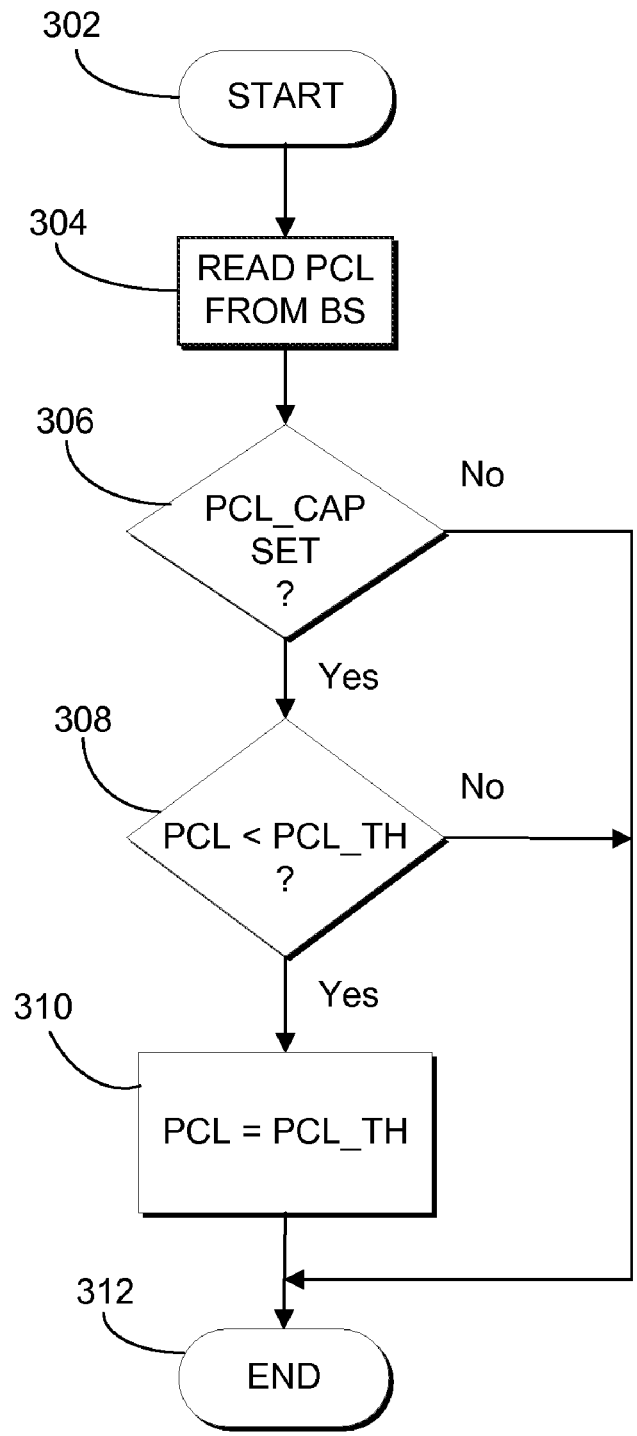
FIG. 3 shows a flow chart diagram of a method for controlling power among wireless modems in a multi-mode communication device, in accordance with an embodiment of the invention.

FIG. 3 shows a flow chart diagram 300 of a method for controlling power among wireless modems in a multi-mode communication device, in accordance with an embodiment of the invention. The method illustrated in FIG. 3 corresponds to hardware as illustrated in FIG. 2. At the start 302, the multi-mode communication device is powered on and both wireless modems are ready to commence communication activity. In particular, the second wireless modem begins a communication activity. The communication activity may be, for example, receiving a call, initiating a call, commencing a hand over of service from the first wireless modem to the second wireless mode, and so on. While the second modem is interacting with its affiliated base station or supporting infrastructure equipment, it will receive a PCL assignment 304. Upon receiving the PCL assignment, according to the invention, the wireless modem that is subject to the operating power restriction responds to the power control indicator, such as by checking a PCL_CAP flag 306. If the state of the power control indicator doesn't require a restricted maximum operating power level, the rest of the process is bypassed and the method terminates 312. If, however, the state of the power control indicator does require a restricted operating power level, the modem, in the present example, checks the received PCL against the PCL_TH value 308. If the received PCL corresponds to a power level which is lower than that indicated by the PCL_TH variable, the method terminates 312 and the modem commences communication activity at the assigned PCL level. If the received PCL corresponds to a power level that is higher than PCL_TH, however, then the modem sets its operating power level to that corresponding to PCL_TH at 310, and the modem commences communication at the restricted operating power level corresponding to PCL_TH. Although shown here as a straight-through process, those skilled in the art will appreciate that the method may be periodically repeated during the communication activity, such as when the base station or supporting infrastructure send a new PCL assignment, in which case the method may be repeated, commencing at process 304.

Figure 4:
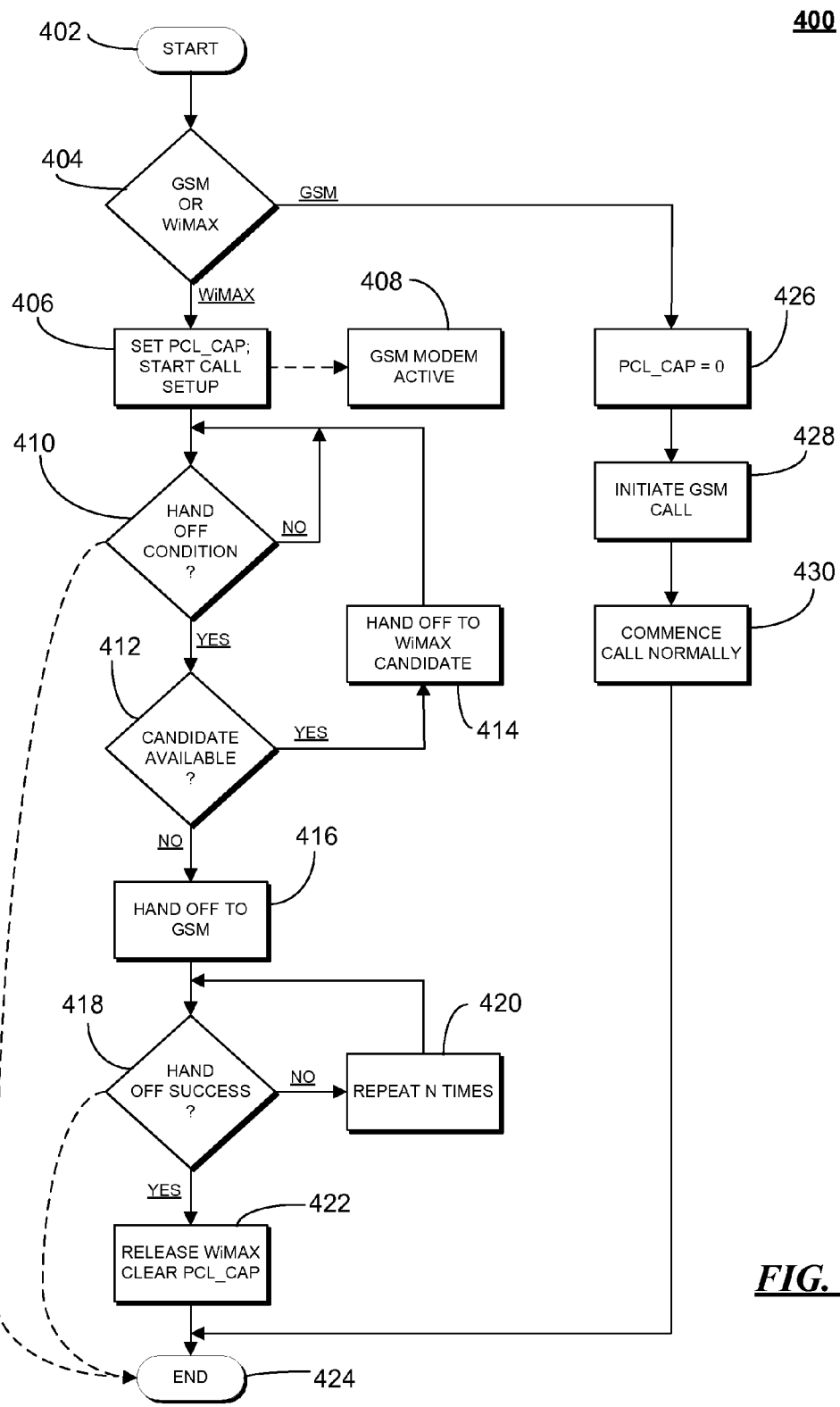
FIG. 4 shows a flow chart diagram of a method for controlling power in a multi-mode communication device when handing a call over from one wireless modem to another wireless modem of the multi-mode communication device, in accordance with an embodiment of the invention.

An example of a how the invention may operate in the context of a particular communication activity is given in FIG. 4. FIG. 4 shows a flow chart diagram 400 of a method for controlling power in a multi-mode communication device when handing a call over from one wireless modem to another wireless modem of the multi-mode communication device, in accordance with an embodiment of the invention. At the start 402 the multi-mode communication device is powered on and ready to engage in communication activity. The presently contemplated example uses a multi-mode communication device having a WiMAX modem and a GSM modem, and those skilled in the art will appreciate that other air interface specifications may be employed by the wireless modems of the multi-mode communication device. For example, the second wireless modem may operate in accordance with a code division multiple access (CDMA) air interface. In the present example, a user of the multi-mode communication device commences a call. A call results in a communication link being established between the multi-mode communication device and supporting infrastructure communication equipment via a radio interface. The multi-mode communication device, in the present example, first determines whether the call is a WiMAX call or a GSM call 404. Assuming the call is a WiMAX call, the multi-mode communication device then sets the PCL_CAP flag, and starts the call using the WiMAX modem 406. At the same time, the GSM modem may be active 408, registering for service and camping on a suitable cell. With the PCL_CAP flag set the GSM modem may have to restrict its operation power level while maintaining a connection to the GSM infrastructure, as shown and discussed with reference to FIG. 3.

While the WiMAX call is commencing, the multi-mode communication device is making measurements and other determinations including whether or not the call should be handed over to a different infrastructure entity 410. Also, while the multi-mode communication device is monitoring for a handover condition, the call may terminate, at which time the method will end 422 as indicated by the dashed line from 410 to 424. If a handover condition occurs, the multi-mode communication device determines if any suitable WiMAX neighbor candidate stations are available 412. If a suitable WiMAX candidate station is available, then the call is handed over to the neighbor 414 and the call commences at the WiMAX modem. However, if a suitable WiMAX candidate station is not available, then the multi-mode communication device will attempt to hand to call over to GSM service via the GSM modem 416 using an intersystem handover process. The multi-mode communication device may attempt to hand over the call several times (418, 420). If there is no handover success, the process kicks out and ends 422, as indicated by the dashed line from 418 to 424. If the handover is successful, the multi-mode communication device will release the WiMAX connection, and clear the PCL_CAP flag or other power control indicator 422, allowing the GSM modem to operate without power restrictions. Alternatively, if the call being made is initially a GSM call, as determined at 404, such as if a WiMAX network is not available, the mobile communication device clears the PCL_CAP flag or other power control indicator 426, initiates the call over the GSM modem 428, and commences on the GSM network 430 without a power restriction.

Figure 5:
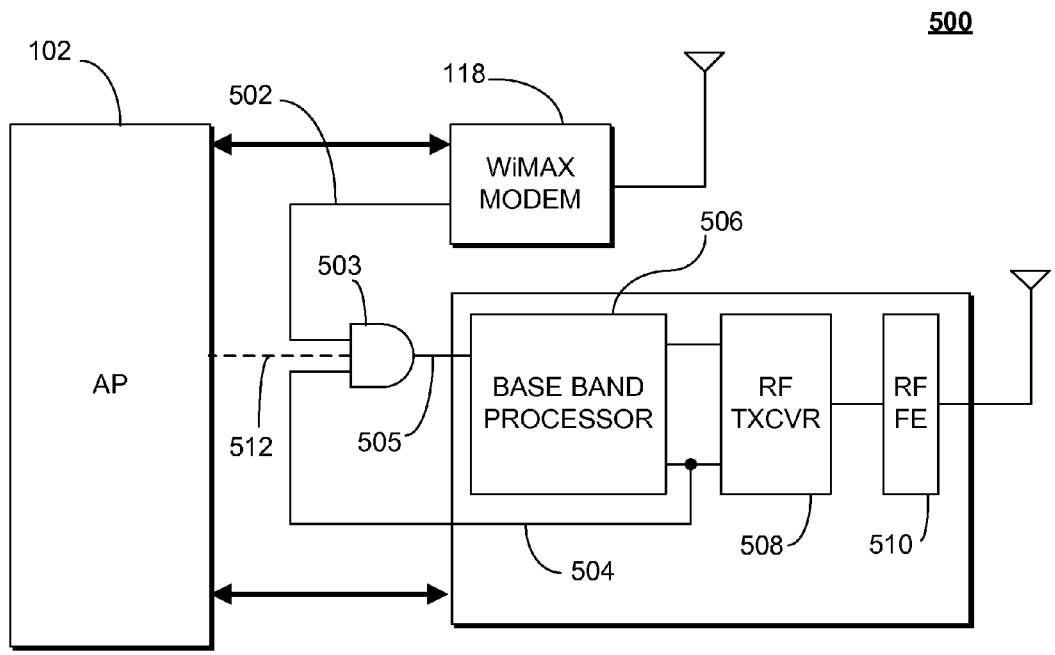
FIG. 5 shows a block schematic diagram of a multi-mode communication device including control circuitry for controlling power of a wireless modem of the multi-mode communication device, in accordance with an embodiment of the invention.

Referring now to FIG. 5, there is shown a block schematic diagram 500 of a multi-mode communication device including control circuitry for controlling power of a wireless modem of the multi-mode communication device, in accordance with an embodiment of the invention. The present example illustrates a hardware oriented solution for restricting the operating power level of the second wireless modem. The first wireless modem 118 provides a transmit enable signal 502 which is asserted when the first wireless modem is transmitting. Similarly, the second wireless modem 120 provides a transmit start signal 504. Signals 502 and 504 are fed to a logic AND gate 503, or equivalent, and the output of the AND gate 505 is fed to the baseband processor 506 of the second wireless modem. The AND gate output 505 may be fed to, for example, a general input/output port of the baseband processor. When signal 505 is asserted in the present example, it indicates that both first and second wireless modems are transmitting, and, accordingly, the baseband processor 506, which controls operation of the second wireless modem in response to the application processor 102, sets the power output level of the second wireless modem to a reduced level, if necessary, as may be indicated by the PCL_TH setting and a received PCL assignment, for example. The baseband processor also provides the transmit start signal 504, along with baseband signals, to a radio frequency transceiver 508, which mixes, modulates, and filters the baseband signal with a carrier signal to produce a low power RF signal which is fed to the RF front end 510 for amplification and transmission. The RF front end, transceiver and baseband processor also function in the reverse direction to receive information, as is known.

The operation of the AND gate to restrict the power level of the second wireless modem may be selectively controlled, based on the battery condition. A third line 512 providing input from the application processor may be used to allow the application processor to enable or disable operation of the AND gate. The AND gate may be disabled when, for example, the battery is near a fully recharged condition, and voltage droop is not a concern.

Figure 6:
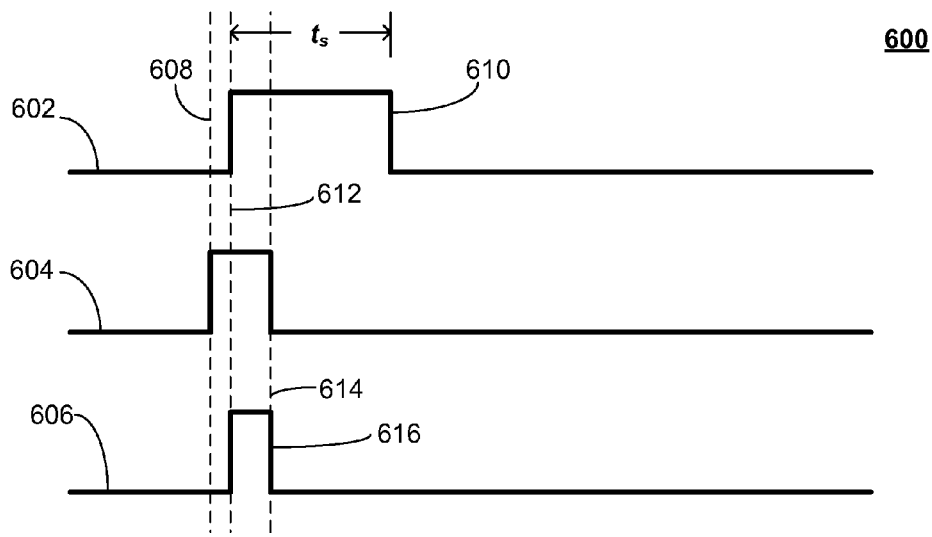
FIG. 6 shows a timing diagram of control signals for controlling power of a wireless modem, in accordance with an embodiment of the invention.

FIG. 6 shows a timing diagram 600 of control signals for controlling power of a wireless modem, in accordance with an embodiment of the invention. Three lines are given representing the transmit enable signal 602 provided by the first wireless modem, the transmit start signal 604 provided by the second wireless modem, and the output 606 of the AND gate 503, as they correspond to 502, 504, and 505, respectively, of FIG. 5. It will be appreciated that each of the wireless modems, operating using different air interfaces, may have different timing formats and will likely be operating asynchronously with respect to each other. Accordingly, there are likely to be unavoidable "collision" periods where both modems are transmitting. In the present example, the second wireless modem commences transmitting first at time 608, which is slightly ahead of the time at which the first wireless modem begins transmitting at time 612. The second wireless modem ceases transmitting at time 614, at the end of its present transmission time slot. As a result, the output of the AND gate 505 in FIG. 5 produces a pulse 616 when both modems are transmitting. The first wireless modem ceases transmitting upon the end of its slot transmit time 610. According to the invention, in the present example, when the output of the AND gate goes high, as during pulse 616, the second wireless modem may restrict it's transmit power level to a preselected level. It will be appreciated, however, that since the AND gate pulse 616 commences after the second wireless modem begins transmitting during the transmit slot time, the air interface used by the second wireless modem may not permit a mid-slot power level transition. Alternatively, the second wireless modem may simply be unable to change transmit power level during a transmit time slot by design. Therefore, the circuit arrangement of FIG. 5 may not be appropriate for some air interfaces or modem designs.

Figure 7:
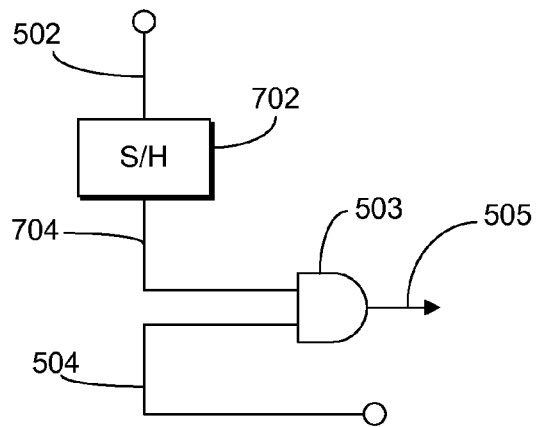
FIG. 7 shows a control circuit schematic diagram of a control circuit for controlling power of a wireless modem, in accordance with an embodiment of the invention.

FIG. 7. shows a control circuit schematic diagram of a control circuit 700 for controlling power of a wireless modem, in accordance with an embodiment of the invention. As in FIG. 5, an AND gate 503 combines signals provided by the first and second wireless modems. To address the situation where the modem subject to a potential operating power restriction begins transmitting before, and overlapping with another modem, the present embodiment uses a sample and hold circuit 702. The sample and hold circuit is responsive to the transmit enable signal 502 and follows the rise of the transmit enable signal, but holds it after the transmit enable signal de-asserts for a period of time. That is, as soon as the transmit enable signal asserts, the output of the sample and hold circuit will assert as well, but when the transmit enable signal de-asserts, the output of the sample and hold circuit will continue in the asserted state for a period of time. In the present example the hold time is selected to be at least long enough to last for the remainder of a frame time of the air interface used by the first wireless modem. By having the output of the sample and hold circuit held asserted for the duration of a frame, the output of the AND gate will always be asserted when the second wireless modem commences a transmission. The output of the AND gate acts as the power control indicator to the second wireless modem, and the sample and hold circuit ensures that the power control indicator will be asserted while communication activity is occurring at the first wireless modem, at least when the second wireless modem is also transmitting.

Figure 8:
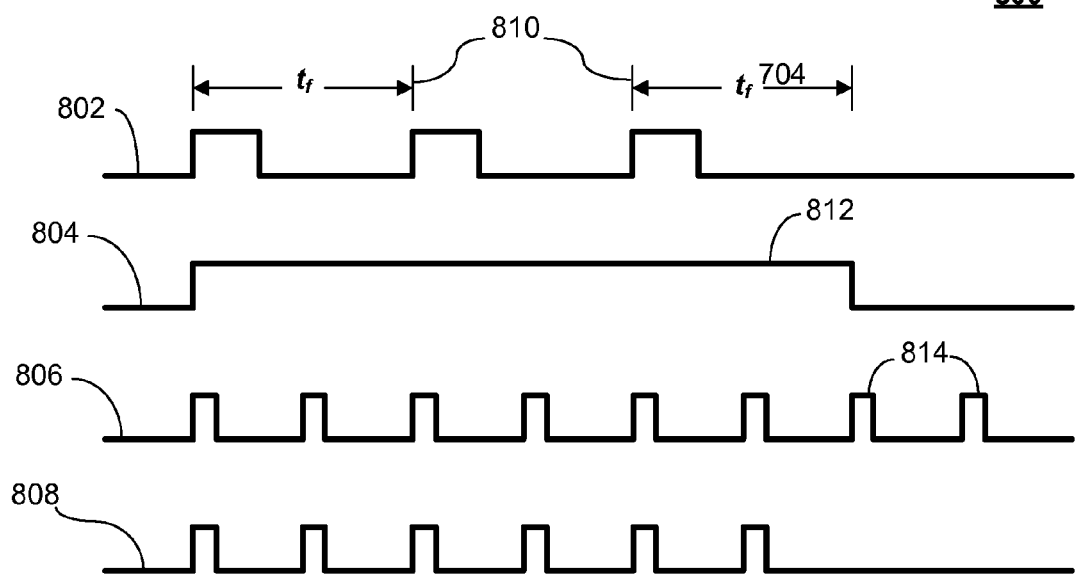
FIG. 8 shows a timing diagram of control signals for controlling power of a wireless modem, in accordance with an embodiment of the invention.

FIG. 8 shows a timing diagram 800 of control signals for controlling power of a wireless modem, in accordance with an embodiment of the invention, and in particular using the control circuit of FIG. 7. Signal line 802 shows the transmit enable signal provided by the first wireless modem. A series of pulses can be seen representing periods where the first modem is actually transmitting during a communication activity. The pulses occur at frame intervals $t_f$ 810. Signal line 804 shows the output of the sample and hold circuit 702 in response to the transmit enable signal 502, as shown on signal line 802. Since the sample and hold circuit output is refreshed by the transmit enable signal pulses, the output of the sample and hold circuit is a long duration pulse that remains asserted for the duration of the communication activity carried out by the first wireless modem. Signal line 806 represents the transmit activity of the second wireless modem as indicated by a transmit start signal 504. Signal line 808 shows the output 505 of an AND gate 503 or equivalent circuit in response to signal lines 804 and 806. Signal line 804 illustrates how the output of the sample and hold circuit asserts with the transmit enable signal, but holds for a period of time until de-asserting, and subsequent pulses of the transmit enable signal refresh the sample and hold circuit. However, after the expiration of a frame period, with no more assertions by the transmit enable signal, the output of the sample and hold circuit de-asserts. Since the output of the sample and hold circuit remains asserted during communication activity at the first wireless modem, even though it may not be transmitting, the output (808) of the AND gate will essentially follow the transmit start signal 806. It can also be seen that once the communication activity at the first wireless modem ceases, and the output of the sample and hold circuit de-asserts, the power control indicator (808) is not asserted, and, as shown here, two transmit events 814 of the second wireless modem are not subject to a restricted operating power level.

It will be appreciated by those skilled in the art that the power control aspects of the invention may be applied to either or both the first and second wireless modems. It is contemplated in some configurations that the first wireless modem's power level may also be restricted when both modems are engaged in communication activity. Furthermore, the terms "first wireless modem" and "second wireless modem" are used by convention here, and may be interchangeable, such that it is equivalent if the second wireless modem commences a communication activity and a transmit power level restriction is imposed on the first wireless modem in response.

Figure 9:
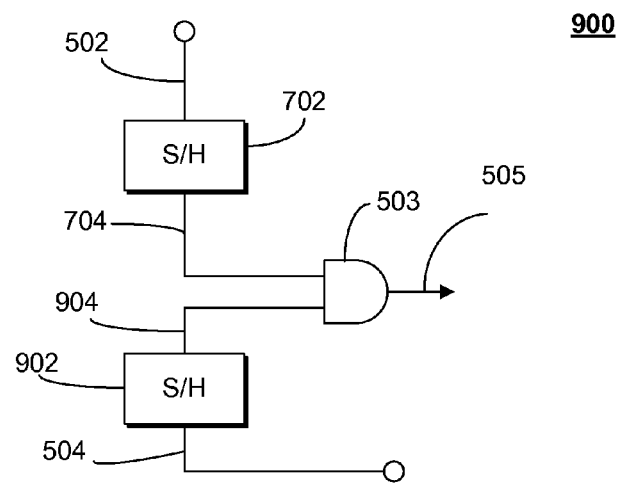
FIG. 9 shows a control circuit schematic diagram of a control circuit for controlling power of a wireless modem, in accordance with an embodiment of the invention.
Figure 10:
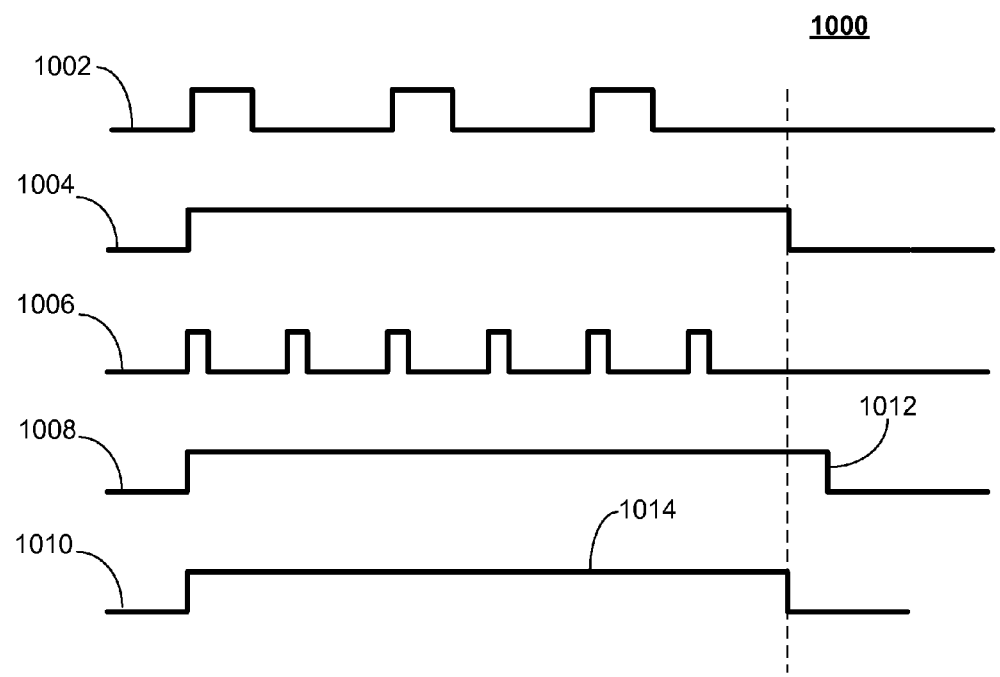
FIG. 10 shows a timing diagram of control signals for controlling power of a wireless modem, in accordance with an embodiment of the invention.

FIG. 9 shows a control circuit schematic diagram of a control circuit 900 for controlling power of a wireless modem, in accordance with an embodiment of the invention. As an alternative arrangement, it is contemplated that a second sample and hold circuit 902 may be used on the transmit start line 504. The second sample and hold circuit 902 operates similarly to the first sample and hold circuit 702 with respect to the second wireless modem's air interface, holding the transmit start line assertion for at least a period of time substantially equal to a frame time of the second modem's air interface. FIG. 10 shows a timing diagram 1000 of control signals for controlling power of a wireless modem, using the control circuit of FIG. 9, in accordance with an embodiment of the invention. Shown are the transmit enable signal of the first wireless modem (1002), the output of the first sample and hold circuit (1004), the transmit start signal of the second wireless modem (1006), the output of the second sample and hold circuit (1008), and the output of the AND gate (1010). As in FIG. 8, the output of the first sample and hold circuit is asserted upon the occurrence of a transmit event pulse, and stay asserted so long as pulses are repeated within the hold time, and de-asserts when pulses cease after the hold time. Similarly, the output of the second sample and hold circuit asserts for a period 1012 while transmit event pulses are applied from the second wireless modem, within the hold time. As with the first sample and hold circuit, the output of the second sample and hold circuit de-asserts when pulses from the second wireless modem are not received within the hold time. The ANDing of the outputs of the first and second sample and hold circuits results in a signal represented by 1014.

Figure 11:
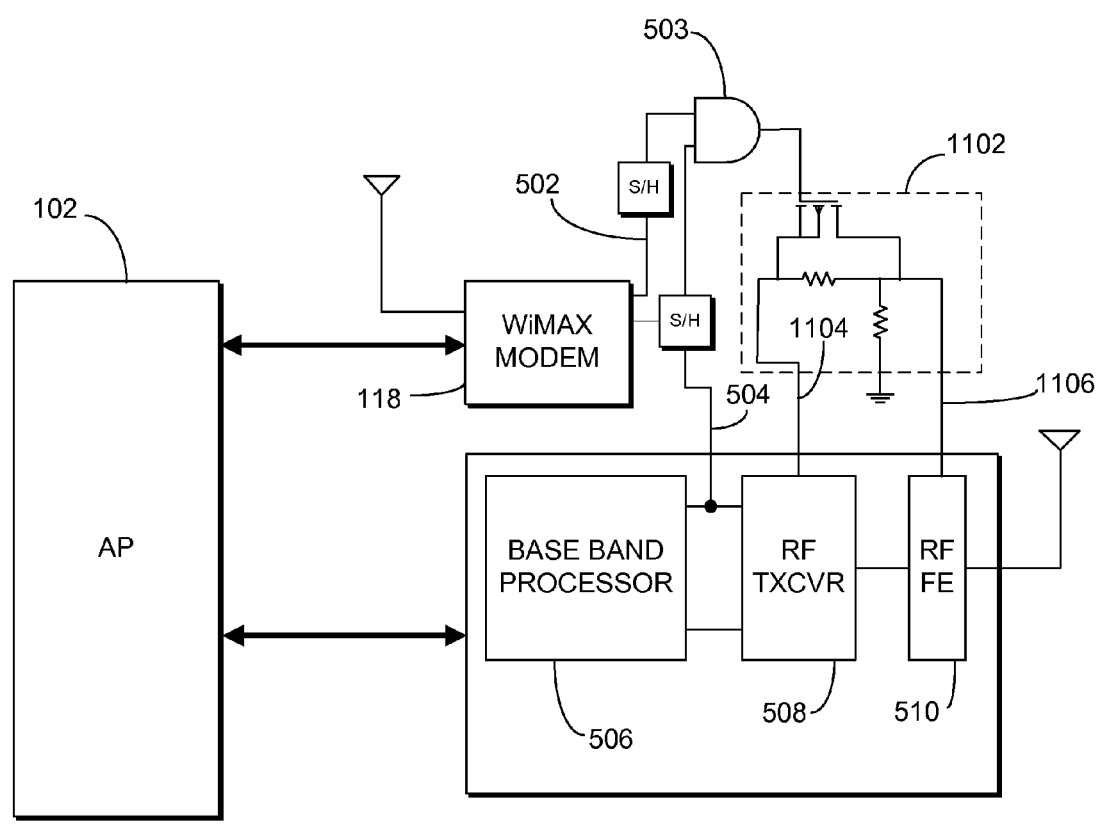
FIG. 11 shows a block schematic diagram of a multi-mode communication device including control circuitry for controlling power of a wireless modem of the multi-mode communication device, in accordance with an embodiment of the invention.

FIG. 11 shows a block schematic diagram 1100 of a multi-mode communication device including control circuitry for controlling power of a wireless modem of the multi-mode communication device, in accordance with a further alternative embodiment of the invention. So far the power control indicator has been embodied as a software flag that is read by the second wireless modem and maintained by the application processor or first wireless modem, or as a logic signal asserted to an input of, for example, a baseband processor of the second wireless modem. The power control indicator may be embodied in any form which allows the second wireless modem to restrict its operating power level while the first wireless modem is engaged in a communication activity involving transmissions. Here, an alternative embodiment of the power control indicator is provided by use of a ramp voltage control circuit 1102. A reference voltage 1104 is provided by the RF transceiver 508 and applied to a voltage divider. The output of the voltage divider 1106 is used as a ramp voltage by the RF front end 510. A switch connected across a portion of the voltage divider is responsive to the power control indicator provided by an AND gate 503. When the output of the AND gate is asserted, the switch changes state, resulting in a different ramp voltage being provided to the RF front end. Since the ramp voltage has an immediate effect on the transmission power, it is preferable to use sample and hold circuits on both inputs of the AND gate to avoid mid-slot power adjustments of the second wireless modem.

This invention can be embodied in other forms without departing from the spirit or essential attributes thereof. Accordingly, reference should be made to the following claims, rather than to the foregoing specification, as indicating the scope of the invention.

What is claimed is:

1. A method for controlling power among first and second wireless modems in a mobile communication device, comprising:
    commencing a communication activity at the first wireless modem;
    asserting a power control indicator while commencing the communication activity at the first wireless modem by setting a power cap flag used by a baseband processor of the second wireless modem;
    restricting a transmit power level of the second wireless modem to a reduced transmit power level while the power control indicator is asserted, the reduced transmit power level being lower than a maximum transmit power level of the second wireless modem and allowing the second wireless modem to perform communication activity;
    ceasing the communication activity at the first wireless modem;
    de-asserting the power control indicator in response to ceasing the communication activity at the first wireless modem; and
    commencing a communication activity at the second wireless modem, wherein the transmit power level of the second wireless modem is allowed to exceed the reduced transmit power level while the power control indicator is de-asserted;
    wherein the first and second wireless modems are commonly powered by a battery source.

2. A method for controlling power as claimed in claim 1, wherein setting the power cap flag further includes indicating a power level setting, wherein the power level setting is lower than a maximum power setting of the second wireless modem.

3. A method for controlling power as claimed in claim 1, wherein asserting the power control indicator is performed when a transmit enable signal provided by the first wireless modem is asserted, the transmit enable signal indicating when a transmitter of the first wireless modem is transmitting.

4. A method for controlling power as claimed in claim 3, wherein asserting the power control indicator is performed when the transmit enable signal of the first wireless modem and a transmit start signal of the second wireless modem are both asserted.

5. A method for controlling power as claimed in claim 4, wherein asserting the power control indicator is performed by sampling and holding the transmit enable signal of the first wireless modem for a hold time, and wherein the hold time is at least equal to a frame time of an air interface used by the first wireless modem.

6. A method for controlling power as claimed in claim 5, wherein asserting the power control indicator further comprises sampling and holding the transmit start signal of a the second wireless modem, and wherein the hold time is at least equal to a frame time of an air interface used by the second wireless modem.

7. A method for controlling power as claimed in claim 5, wherein asserting a power control indicator comprises adjusting a voltage reference for a ramp voltage of the second wireless modem.

8. A multi-mode mobile communication device, comprising:
- a battery source;
- an application processor;
- first and second wireless modems coupled to the application processor and commonly powered by the battery source, wherein the second wireless modem is operated at a reduced transmit power level when the first wireless modem is engaged in a communication activity, where the reduced transmit power level is lower than a maximum transmit power level of the second wireless modem and which allows the second wireless modem to perform communication activity; and
- a power cap flag in a memory of the multi-mode mobile communication device which is maintained by the application processor to indicate whether the first wireless modem is engaged in a communication activity and which is read by the second wireless modem to determine whether to use the reduced transmit power level.

9. A multi-mode mobile communication device as defined by claim 8, wherein the first and second wireless modems operate according to different air interface protocols.

10. A multi-mode mobile communication device as defined by claim 8, further comprising:
- a transmit enable signal line in a baseband processor of the first wireless modem;
- a sample and hold circuit coupled to the transmit enable signal line having a hold time and an output;
- a logical AND gate for ANDing the output of the sample and hold circuit with a transmit start signal provided by a baseband processor of the second wireless modem, the logical AND gate providing an output which determines whether the second wireless modem operates at the reduced transmit power level.

11. A multi-mode mobile communication device as defined by claim 10, wherein the output of the logical AND gate is coupled to an input of the baseband processor of the second wireless modem.

12. A multi-mode mobile communication device as defined by claim 10, wherein the hold time of the sample and hold circuit is at least equal to a frame time duration of an air interface used by the first wireless modem.

13. A multi-mode mobile communication device as defined by claim 10, wherein the transmit start signal is derived by sampling and holding the output of a transmit start port of the baseband processor of the second wireless modem.

14. A multi-mode mobile communication device as defined by claim 9, wherein the second wireless modem uses a time division multiple access air interface.

15. A transmit power control circuit arrangement in a multi-mode mobile communication device having first and second wireless modems, comprising:
- a first baseband processor in the first wireless modem having a transmit enable output;
- a second baseband processor in the second wireless modem having a transmit start output and a power control input; and
- a logic function having a first input coupled to the transmit enable output of the first baseband processor, a second input coupled to the transmit start output of the second baseband processor, an output coupled to the power control input of the second baseband processor, wherein the logic function provides a power control indicator to the second wireless modem when the first and second wireless modems are simultaneously engaging in communication activity, and wherein the logic function further includes a sample and hold element on the first input having a hold time that is at least equal to a frame time of an air interface used by the first wireless modem;
- wherein the second baseband processor operates a reduced transmit power level while the logic function provides the power control indicator, the reduced power level being lower than a maximum transmit power level of the second wireless modem and allowing the second wireless modem to perform communication activity.

16. A transmit power control circuit arrangement as defined by claim 15, wherein the logic function further comprises a sample and hold element on the second input having a hold time that is at least equal to a frame time of an air interface used by the second wireless modem.

17. A transmit power control circuit arrangement as defined by claim 15, wherein the output of the logic function is coupled to a voltage ramp reference used by the second wireless modem.

* * * * *